Patented Oct. 3, 1933

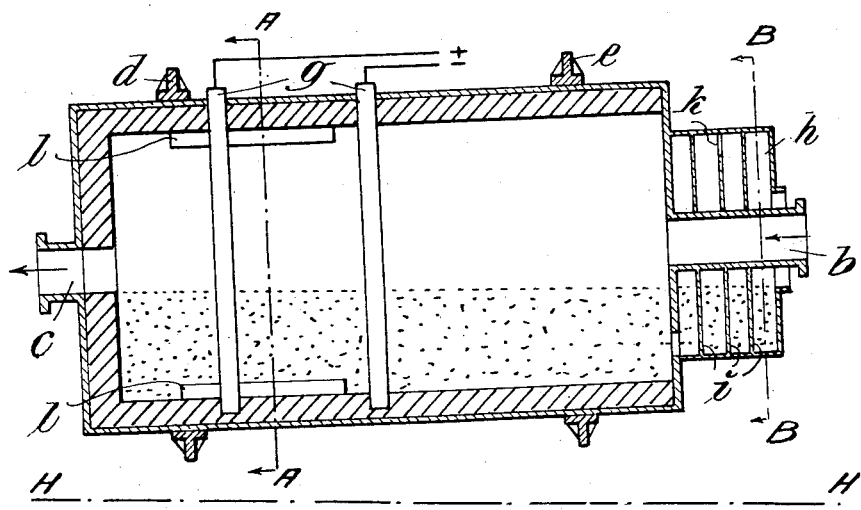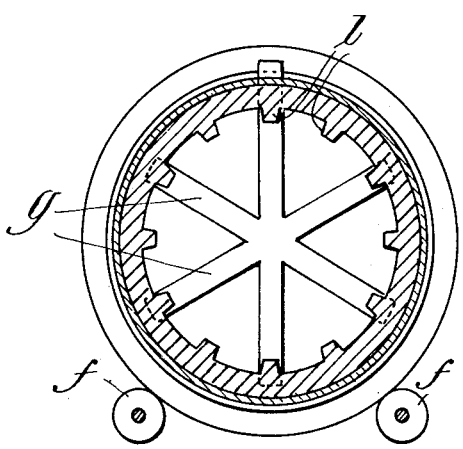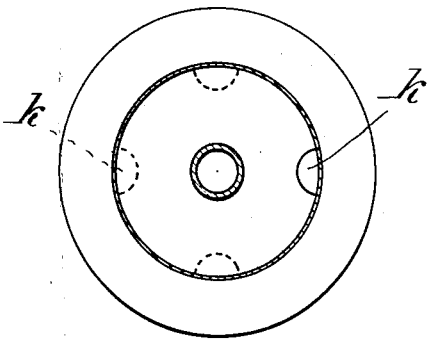

1,929,069

UNITED STATES PATENT OFFICE 1,929,069

METHOD OF REDUCING GASES CONTAINING CARBON DIOXIDE

Bo Michaël Sture Kalling and Carl von Delwig, Avesta, Sweden, assignors to A. Johnson & Co., Stockholm, Sweden, a company of Sweden Application December 7, 1929, Serial No. 412,519, and in Sweden December 10, 1928

3 Claims. (Cl. 23—204)

In the reduction of iron ore, with the use of carbon monoxide as a reducing agent, the carbon monoxide is as a rule generated in such a way that the gas containing carbon dioxide formed by the reduction is allowed to pass through a layer of carbon heated to the necessary temperature, the carbon dioxide during this process being reduced to regenerate carbon monoxide which is reconducted to the reduction furnace.

For this reduction of the gas containing carbon dioxide it has been suggested to use furnaces in which the energy necessary for the process is supplied by the heating of the layer of carbon by means of an electric current which is brought to pass through the same. In these furnaces, which are stationary, it has, however, been found difficult to attain effective reduction, which is a necessary condition for the economy of the ore reducing process. The difficulties are in the first instance caused by the rapidly rising conductivity of the carbon material with a rising temperature. If a certain zone of the mass of carbon attains a higher temperature than the remainder, the conductivity in this zone will increase, causing the current to seek a way preferably through the latter, and this again results in a further increase in temperature. The tendency to local overheating is therefore great in such cases. The gas, again, which is to pass through the layer of carbon has a tendency to pass through the coldest zones, and the result may easily be insufficient or incomplete reduction. A drawback in these reducers is also the fact that the compact layer of carbon may prevent the penetration of the gas, unless comparatively coarse pieces of carbon are being used. If the pieces of carbon are large, the contact surface between the gas and the carbon will, however, be comparatively small, and this entails the fact that a high temperature becomes necessary for producing a sufficient reaction rapidity, which, however, makes the carrying out of the process technically and economically difficult.

According to the present invention the aforesaid drawbacks are obviated by carrying out the process in a rotary furnace with a horizontal or sloping axis. Through the rotation of the furnace the carbon material is all the time being kept in motion and stirred up, whereby an even temperature is obtained in that part of the mass through which the electric current passes. There are, however, certain constructive difficulties in conducting the gas through the layer of carbon in such a rotary furnace. Nevertheless it has also been found that a good result may also be attained by conducting the gas through the furnace above the layer of carbon when the said layer is in constant motion and the mass of the carbon during the rotation of the furnace is continuously raised by the wall of the rotating furnace and then falls down again into contact with the passing gas. The furnace should, however, be of such a length that the time for the passage of the gas through the same will not be too short.

An essential increase in the rapidity of reaction may be attained by the use of finely pulverized carbon material. During the rotation of the furnace this material will then partly be kept suspended in the gas, whereby a very effective carburation will be obtained. The contact between the carbon and the gas may be further improved if the inside walls of the furnace are provided with cams or shovels, adapted to raise part of the carbon powder out of the mass in order to let it thereafter filter down through the passing gas.

In the case of certain kinds of carbon, and particularly when charcoal is used for reduction, it may be advantageous to mix the same with some other carbon material or possibly with some other suitable material which affords better electric current conditions in the furnace. A mixture of charcoal and coke has thus proved to give good results. The electric conductivity of the coke varies namely not so much with the temperature as that of the charcoal, and on account thereof the presence of coke enables a more even regulation of the supply of current and the temperature of the furnace. As charcoal is more easily oxidized than coke, it is in this instance chiefly the charcoal which serves as reducing carbon, for which reason the coke is not consumed to any appreciable extent. The carbon which must be constantly fed into the furnace for replacing the consumed carbon is therefore mainly charcoal.

The feeding of the carbon can in such a rotary furnace through simple devices be effected continuously through a lock designed and constructed in such a way that no appreciable leakage of gas by the same way need occur, which is of importance for the even course of the reducing process.

On the accompanying drawing is shown diagrammatically a form of carrying into effect a reducing furnace according to the present invention.

Figure 1 shows a longitudinal section of the furnace. Figures 2 and 3 show cross sections along the line A—A and B—B respectively in Figure 1.

The furnace consists of a lying cylinder the axis of which, according to the form of construction illustrated, is slightly sloping in relation to the horizontal plane indicated by the line H—H drawn with dots and dashes. The inlet end should, namely, be positioned somewhat higher than the outlet end, as will be seen from the marked position in the charge in the furnace. At both ends of the furnace there are central openings b and c respectively for the inlet and outlet of the gas. The furnace rotates round its axis and is for that purpose provided with outside rings d and e, which in a known manner rest upon support rollers f, which at the same time may serve as propulsion rollers. The furnace is filled to a suitable height with the carbon material which is to be used in the reducing process. The electric current, which in this instance is assumed to be single-phase, is supplied, by way of example, in a known manner through slip rings and slip contacts through the electrodes g, which may be of graphite, carbon, some heat resisting metal alloy or any other suitable material capable of conducting electricity. The electrodes are arranged radially like the spokes of a wheel, one system for each phase, which form of construction has been found suitable. For feeding the carbon into the furnace there is a lock device h, consisting of a drum with a common axis with the furnace, and provided with a number of partition walls i. These partition walls i have each one an opening k at their periphery, and these openings are placed in the different walls in relation to each other, and the number of the partition walls is so great that always one opening is entirely submerged beneath the surface of the carbon material and thus prevents the gas from forcing its way out. The cams l on the inner surface wall serve for raising the carbon material out of the mass during the rotation of the furnace and allow it to filter down through the gas.

The construction of the furnace need naturally not be restricted to the form indicated by the drawing. Every suitable form or shape of furnace which allows it to rotate around a horizontal or sloping axis may be used. The most suitable form should, nevertheless, be the cylindrical form, or a furnace consisting of a cylindrical central part and conical end parts.

The electrodes may also be made in different ways. Important is that they are of such a shape or form that that part of their area which enters into the mass, is fairly constant in every position of the furnace.

Having thus described our invention we declare that what we claim is:—

1. The improvement in the art of reducing a gas containing carbon dioxide in a furnace containing a finely divided carbonaceous material, comprising rotating the carbonaceous material while passing an electric current therethrough to heat same to a suitable temperature, and bringing the gas to be reduced into heat exchanging relation with the heated rotating carbonaceous material.

2. The improvement as set forth in claim 1 in which a part of the rotating carbonaceous material through which the electric current is passed is finely divided so as to be suspended in the gas by the rotation.

3. The improvement as set forth in claim 2 in which an additional carbonaceous material having a lesser electrical conductivity at higher temperatures than does the first mentioned carbonaceous material, is admixed therewith.

BO MICHAËL STURE KALLING.
CARL von DELWIG.